UNITED STATES PATENT OFFICE.

CAMILLO MELHARDT, OF STARNBERG-MUNICH, GERMANY.

PROCESS OF TREATING LIGNITE.

1,205,007. Specification of Letters Patent. Patented Nov. 14, 1916.

No Drawing. Application filed January 20, 1915. Serial No. 3,414.

*To all whom it may concern:*

Be it known that I, CAMILLO MELHARDT, subject of the German Emperor, residing at Starnberg-Munich, Germany, have invented certain new and useful Improvements in Processes of Treating Lignites, of which the following is a specification.

It has been found that pure lignites or such materials which are strongly intermingled with them, as for example, brown coal, peat, or the like, offer considerable resistance to briqueting, whereas this is not the case with brown coal in lumps. The briquets produced from lignites do not possess sufficient compactness and when stored away absorb moisture. Beside these disadvantages of physical nature which make the briqueting of lignites and the like a failure, there are also chemical objections regarding the unfitness of the said materials for briqueting purposes. It has been found that bitumen, which is indispensable for obtaining good briqueting results, is not contained in the cited raw materials in a free condition, but only in very complicated combinations, in most cases esters or imides. Such combinations cannot, however, be melted nor deprived of their water at that temperature which is technically admissible for briqueting. They absorb water, which causes the briquet to burst after it has left the press in apparently solid condition.

According to the origin of the respective raw material, the before mentioned combinations contain, for example, succin-imid or the like, and under certain temperatures which cannot effect a dry distillation of the entire material, they are caused to burst by the escaping gases which are driven off under heat (such as carbon dioxid and carbon monoxid) and thereby lose the capacity of subsequently taking up again water from the atmosphere.

The reason for this is that the bitumen which is thus set free is brought to its natural melting point and, on account of its finely divided condition, especially in the case of pure lignite, closes the numerous pores which would otherwise serve to absorb the water.

The present invention relates to a process for utilizing the qualities of the materials under consideration for obtaining a continuous deprivation and driving off oxygen or, as the case may be, nitrogen combinations, and to improve the calorific effect.

An object of my invention is to provide a process by means of which the specific gravity of the lignite can be lessened, thereby permitting the ready separation of the lignite from the associated foreign matter which may be substantially the same specific gravity, and simultaneously freeing the bitumen. The freeing of the bitumen gives two important results. The first is to close the pores of the material, thus rendering the resulting briquet substantially waterproof, and the second is to obviate the necessity of supplying additional binding material.

It has been found that the bursting of the ester or imides in the raw materials to be treated takes place below the distilling temperature, when, according to the kind and quantity of the combinations under treatment, a temperature from 180–250 degrees centigrade is allowed to act for a sufficient period of time (8–10 hours) on the previously dried material, and in closed vessels permitting the gases to escape.

The heating period as well as the height of temperature are very essential. A change of the combinations at the indicated temperatures can in most cases only be realized after several hours. Essentially the lower temperatures do not result in, even after a longer period of time, a complete decomposition of the ester.

The lignites, brown coal, or other materials which enter into consideration for this process, are naturally of lighter specific weight, float on water, and are difficult to be moistened by same, and therefore absorb little or almost no water.

The heat required for separating the chemical combinations can be produced by electrical current.

Example I: The material, suitably broken in nut-shape, is as far as possible, previously dried and then heated to a temperature of 180–250 degrees centigrade, in closed vessels permitting the gas to escape. The heating is to be continued as long as water-vapors and non-condensed gas, as for example, carbonic acid, are being driven off. From eight to ten hours will generally be required. The loss of gas and water driven off, will amount to 15–20% after complete drying. The material is cooled in any known manner, and is ready for use, if the impurities, the ashy portions, do not exist. The calorific effect of the material thus treated amounts according to the raw material to be treated, to 6000–7500 calories, the valuable heating elements being retained.

Example II: The material is treated in the same way as described in the foregoing example, only electrical energy is used as a source of heat.

Example III: Wet brown coal intermixed with well preserved pieces of wood is, on account of its great amount of resins, the most valuable one and often erroneously termed lignite but contains great quantities of other matters, which considerably raise the ash content of this fuel and therefore make important coal mines unprofitable. A separation by means of the so-called "coal washing" is impossible with this material, for the reason that coal and other matter have in their natural condition, almost the same specific weight. This is, however, changed as hereinbefore described, when proceeding in the way indicated by Example I or II. The fuel thus obtained floats on the water level, whereas the other matter, unchanged by the treatment, sinks. The separation of certain materials naturally more dense, is effected by floating the fuel on a liquid medium heavier than water, such as a salt solution of 1–2 Bé. strength.

The fuel materials treated according to I and II examples, are placed immediately after leaving the heating vessels, into water or strongly diluted salt solutions and the other matters which sink to the bottom are drawn off in the customary manner of coal washing.

I claim:—

1. The herein described method of treating lignites, peat, and the like for the purpose of increasing their calorific effect and their permanent dephlegmation, which consists in heating the material in a closed vessel with outlet to drive off certain of the gases and all of the water, and maintaining the temperature sufficiently low and in such a duration to prevent the decomposition of the remaining heat giving elements capable of decomposition, and separating out the ashy portions of the treated material.

2. The herein described method of treating lignites, peat, and the like for the purpose of increasing their calorific effect and their permanent dephlegmation, which consists in heating the material in a closed vessel with outlet to drive off certain of the gases and all of the water, maintaining the temperature sufficiently low and in such a duration to prevent the decomposition of the remaining heat giving elements capable of decomposition and separating out the ashy portions of the treated material by subjecting the material to a sifting action in water or a salt solution.

3. The herein described method of treating lignites and the like, which consists in drying the same, heating the material in a closed vessel until all the water and certain of the gases have been driven off and the bitumen has been set free, and subsequently separating the material thus treated from the heavier foreign matter.

4. The herein described method of treating lignites and the like, which consists in drying the same, heating the material in a closed vessel until all the water and certain of the gases have been driven off and the bitumen set free, and subsequently separating the lighter treated material from the heavier material accompanying it by floating the same on a liquid medium of greater specific gravity than the treated material and of less specific gravity than the foreign matter.

5. The herein described method of treating lignites and the like, which consists in drying the same, heating the material in a closed vessel until all of the water and certain of the gases have been driven off and the bitumen has been set free, and subsequently separating the lighter treated material from the heavier material accompanying it by floating the same on a salt solution.

In testimony whereof I have affixed my signature in presence of two witnesses.

CAMILLO MELHARDT.

Witnesses:
N. ROEDER,
ARTHUR GUBE.